United States Patent [19]
Dach

[11] 3,968,707
[45] July 13, 1976

[54] HYDRAULIC SPEED-CHANGING SYSTEM

[75] Inventor: Hansjörg Dach, Friedrichshafen, Germany

[73] Assignee: Zahnradfabrik Friedrichshafen AG, Friedrichshafen, Germany

[22] Filed: Dec. 2, 1974

[21] Appl. No.: 528,940

[30] Foreign Application Priority Data
Dec. 5, 1973    Germany............................ 2360513

[52] U.S. Cl................................. 74/869; 74/752 C
[51] Int. Cl.² ................... B60K 41/18; G05G 21/00
[58] Field of Search........... 74/869, 868, 867, 752 C

[56] References Cited
UNITED STATES PATENTS

| | | | |
|---|---|---|---|
| 3,400,613 | 9/1968 | Johnson et al. | 74/869 |
| 3,509,784 | 5/1970 | Mahoney | 74/869 |
| 3,593,598 | 7/1971 | Winn et al. | 74/869 X |
| 3,593,599 | 7/1971 | Dach | 74/869 |
| 3,651,714 | 3/1972 | Ohya et al. | 74/869 X |
| 3,744,348 | 7/1973 | Lemon | 74/869 |

*Primary Examiner*—Benjamin W. Wyche
*Assistant Examiner*—Lance W. Chandler
*Attorney, Agent, or Firm*—Karl F. Ross; Herbert Dubno

[57] ABSTRACT

A hydraulic speed-changing system for an automotive transmission includes a clutch K2 actuatable by a control valve with associated damper which delays full operation of the clutch to smooth the cut-in. The same clutch is used in third gear and in reverse, its actuation being accompanied in the latter instance by that of a brake B2. Fluid pressure used to control the operation of this brake is also utilized to exert upon the control valve of clutch K2 a supplemental force reducing the delay period of the damper.

7 Claims, 6 Drawing Figures

| GEAR | K1 | K2 | B1 | B1F | B2 | F |
|------|----|----|----|----|----|----|
| 1. | + | − | − | − | + | + |
| 2. | + | − | + | + | − | − |
| 3. | + | + | − | + | − | − |
| R | − | + | − | − | + | − |

| FIG. 3 | FIG. 4 | FIG. 5 |
|--------|--------|--------|

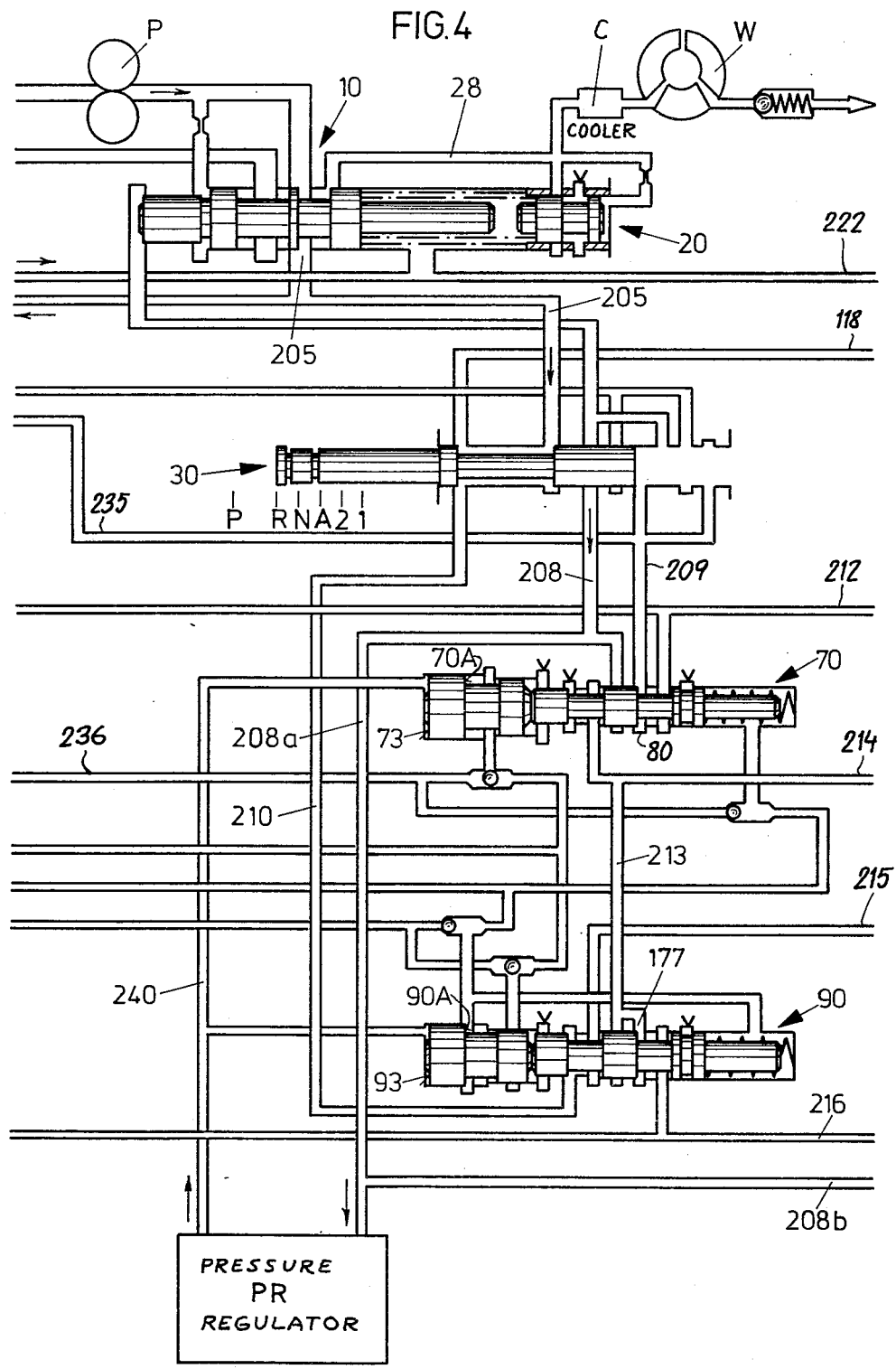

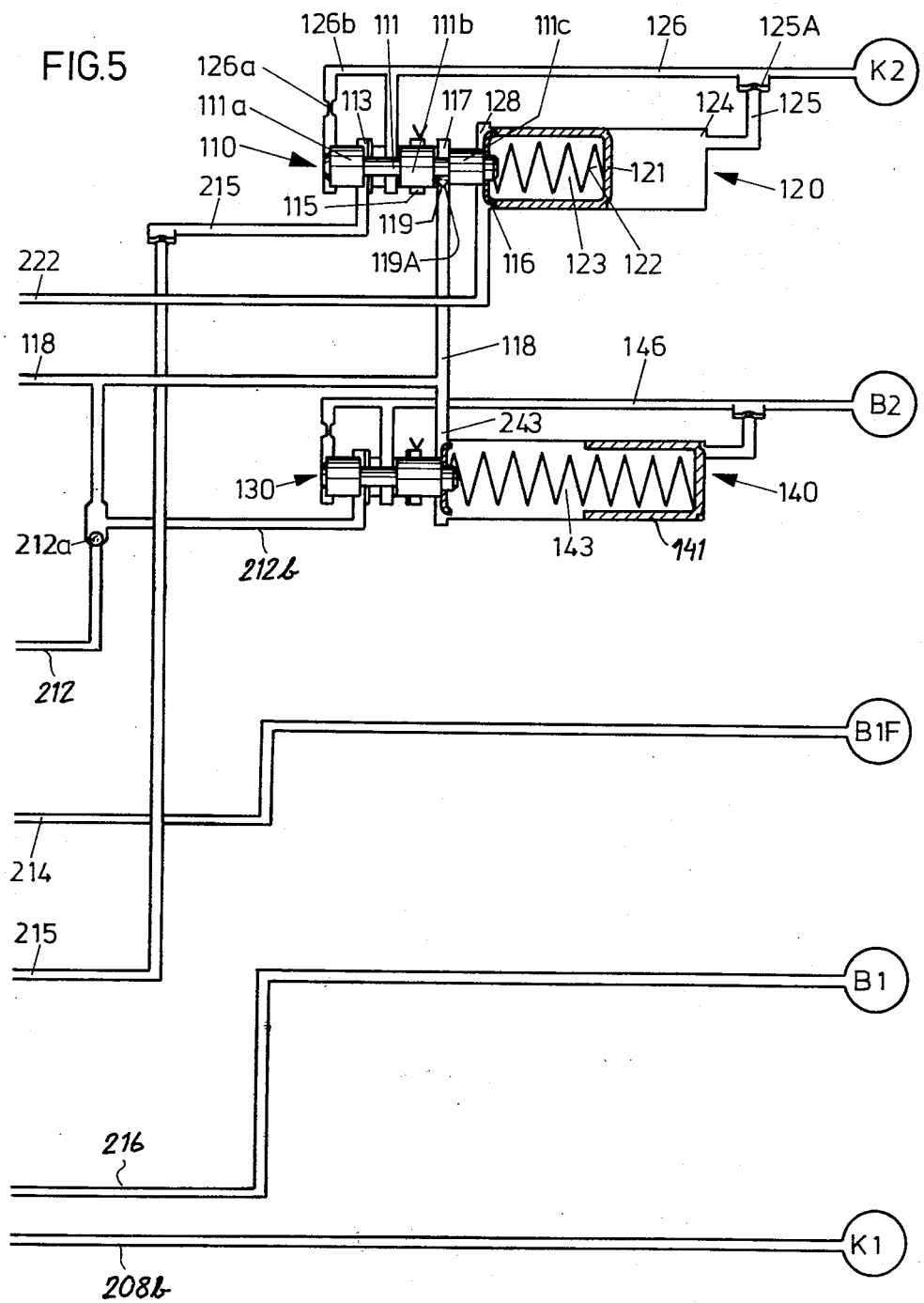

3,968,707

HYDRAULIC SPEED-CHANGING SYSTEM

FIELD OF THE INVENTION

My present invention relates to a speed-changing system of the fluid-operated type, generally hydraulic, as used for example in an automotive transmission for driving an output shaft from a fuel-powered engine.

BACKGROUND OF THE INVENTION

In my prior U.S. Pat. Nos. 3,580,112 and 3,593,599 I have disclosed a transmission system of this general type wherein several forward speed ratios (conventionally referred to as first, second and third gear) and a reverse speed ratio of the output shaft, with reference to the engine, can be brought about under the control of a manually settable speed selector and switchover means controlled thereby, the speed selector having several forward positions (not all of them being of interest here) and a reverse position. In a forward position, switching between low ("first gear"), intermediate ("second gear") and high ("third gear") forward speed ratios takes place automatically in response to changes in the position of an accelerator pedal, giving rise to a load-dependent fluid pressure, as well as in the speed of the output shaft which is sensed by another fluid-pressure generator. Via a conventional planetary-gear train, shifting from first through second to third gear and vice versa is effected with the aid of several clutches and brakes (collectively termed "drive-establishing means"), one such clutch being actuated in both third gear and reverse. A damper associated with a control valve for this clutch serves to retard full operation thereof by a substantially invariable delay period, as disclosed in the second one of my above-identified prior patents, in order to insure a smooth cut-in. This is accomplished by subjected the damper to a load-dependent fluid pressure balancing load-dependent variations in the supply pressure under which fluid is admitted to the clutch via the control valve in the off-normal position of two cascaded shift valves, a feedback connection from the clutch to the cylinder of the control valve tending to displace the piston thereof against a biasing force from a normal position into a throttling position upon partial pressurization of the clutch. The associated damper comprises a plunger mechanically linked with this piston, the plunger responding to further pressurization of the clutch by restoring the piston to its normal position in which fluid from the high-pressure supply is rapidly admitted to the clutch to complete its operation.

Such an arrangement, which retards full clutch operation by a substantially constant delay period, is advantageous in that it makes the cut-in time virtually independent of changes in the supply pressure while letting the final clutch pressure vary with load. A drawback, however, resides in the fact that the same delay period intervenes upon upshifting to third gear and upon shifting into reverse, the latter operation occurring generally on standstill or at very low speeds making such a delay unnecessary and wasteful in terms of excessive wear of the friction layers of the clutch.

OBJECT OF THE INVENTION

The object of my present invention, therefore, is to provide an improved system of the aforedescribed type in which this drawback is obviated.

SUMMARY OF THE INVENTION

I realize this object, in accordance with my present invention, by the provision of damping means for the aforementioned clutch responsive to the speed selector for retarding full operation of the clutch by a relatively long delay period in a forward position and by a relatively short delay period in the reverse position of that selector.

In a system as described in my above-identified prior patents in which actuation of the clutch in reverse is accomplished by the concurrent actuation of a brake, the damping means for the clutch may be fluidically coupled with that brake for reducing its delay period in response to fluid pressure used to control the operation of the brake. More particularly, an ancillary inlet port on the cylinder of the control valve of the clutch may be connected to a conduit serving to pressurize the brake damper from a fluid source to which this conduit is connected in the reverse position of the speed selector. Advantageously, according to a further feature of my invention, this fluid pressure is differentially applied to the piston of the clutch-controlling valve, in a sense aiding the biasing force acting upon its piston, by locating the ancillary inlet port between two piston heads of different diameters.

BRIEF DESCRIPTION OF THE DRAWING

The above and other features of my invention will now be described in detail with reference to the accompanying drawing in which:

FIG. 1 is a diagram showing a basic transmission of the planetary-gear type forming part of a speed-changing system according to my invention;

FIG. 2 is a table showing the selective actuation of several clutches and brakes forming part of the speed-changing system;

FIGS. 3 – 5, when positioned side by side, show details of the system to the extent necessary for an understanding of my present improvement; and FIG. 6 shows the manner in which FIGS. 3 – 5 are to be juxtaposed.

SPECIFIC DESCRIPTION

Figures 1, 2, 6:
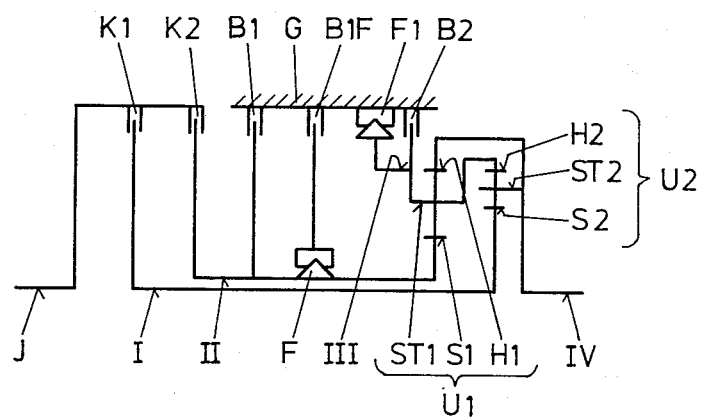

Throughout the following description, elements having counterparts in my prior U.S. Pat. Nos. 3,580,112 and 3,593,599 will be identified by the same reference characters as far as practical.

In FIG. 1 I have shown a shaft J driven from a nonillustrated engine shaft via a hydraulic converter W (see FIG. 4). Shaft J works into a planetary-gear set with two input shafts I and II, an intermediate shaft III, and an output shaft IV which drives the traction wheels of the vehicle powered by the engine. Shaft J can be drivingly connected with either or both of the two input shafts I and II via respective hydraulic clutches K1, K2, shaft II being also immobilizable by a first hydraulic brake B1 whereas a second hydraulic brake B2 serves to arrest the shaft III. Brake B1, which is of the ordinary bidirectional type, is supplemented by a one-way brake BIF acting upon the shaft II through an overrunning clutch or freewheel F; a similar freewheel F1 is disposed between shaft III and the transmission housing in parallel with brake B2. These clutches and brakes control two cascaded planetary-gear trains U1, U2 having sun gears S1, S2 rigid with shafts II and I, respectively. Train 1 has a planet carrier ST1 connected via shaft III with the ring gear H2 of train U2 whose planet carrier ST2 is rigid with output shaft IV and also with the ring gear H1 of train U1.

In the table of FIG. 2 a plus sign (+) indicates the operated condition and a minus sign (−) indicates the idle condition of any frictional coupling element or drive-establishing means for three forward speed ratios 1 (low), 2 (intermediate) and 3 (high) as well as one reverse speed ratio (R). It will be noted that clutch K2 intervenes in third gear and reverse, brake B2 being active in reverse and first gear.

Figure 3:
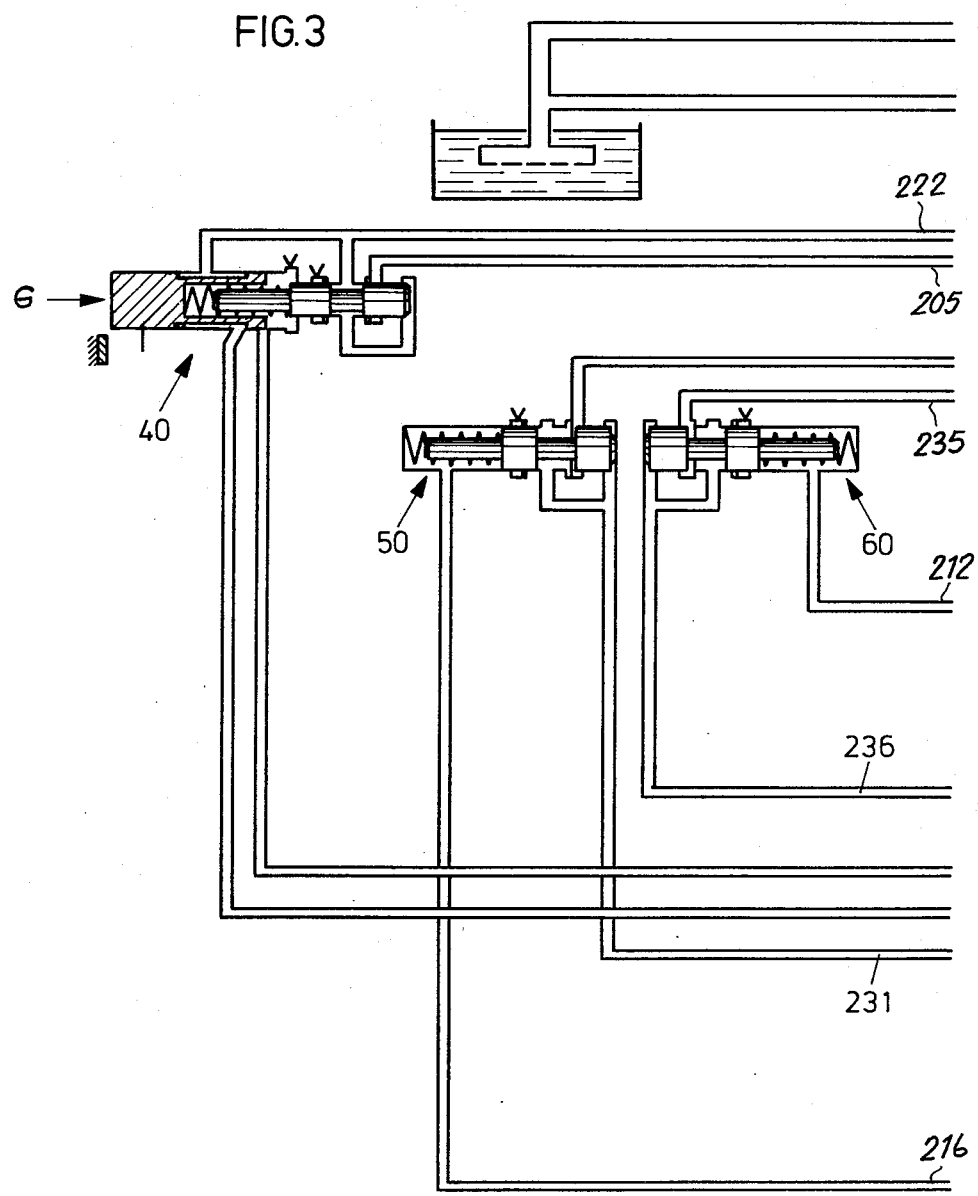

In FIGS. 3 – 5 I have shown a somewhat simplified version of the system illustrated in FIGS. 1 – 5 of my prior U.S. Pat. No. 3,593,599, including a master valve 10 receiving high-pressure hydraulic fluid (oil) from a pump P, an ancillary valve 20 feeding the torque converter W through a cooler C, a manual speed selector 30, a throttle valve 40 responsive to the position of an accelerator symbolized by an arrow G, a pair of stop valves 50 and 60, two cascaded shift valves 70 and 90, a control valve 110 with associated damper 120 for clutch K2, a similar control valve 130 with associated damper 140 for brake B2, and a speed-responsive pressure regulator PR. Selector 30 has positions P (parking), R (reverse), N (neutral), A (automatic, i.e. normal drive), 2 (the same, limited, however, to second gear), and 1 (ditto, limited to first gear). In its forward positions A, 2 and 1, selector 30 connects a supply line 205 to a conduit 208 with an extension 208a leading to pressure regulator PR and a further spur 208b extending to clutch K1; an output line 240 of regulator PR terminates at cylinder bores 73 and 93 of valves 70 and 90.

A conduit 222, emanating from throttle valve 40, delivers hydraulic fluid under load-dependent pressure to master valve 10 and also to a ring channel 128 to the left of a disk 116 forming part of damper 120.

Disk 116 is mounted on a piston 111 of control valve 110 which has three heads 111a, 111b and 111c, the latter being of smaller diameter than heads 111a and 111b. In its illustrated normal position, piston 111 allows high-pressure fluid from conduits 205, 208, 213 and 215, which are interconnected in position A of selector 30 with valves 70 and 90 in their upshifted positions, to pass at high rate into a conduit 126 feeding the clutch K2. A feedback connection 126b of conduit 126, provided with a constriction 126a, terminates at the left-hand end of the cylinder of valve 110 to tend to shift the piston 111 to the right against the force of a biasing spring 122 which also bears upon a plunger 121 slidable in a damping cylinder 123. A compartment 124 of damping cylinder 123 ahead of plunger 121 communicates with conduit 126 via a line 125 including a one-way throttle 125a which may comprise a check valve in parallel with a constriction as shown in U.S. Pat. No. 3,593,599. A ring channel 113 in the cylinder of valve 110, connected to conduit 215, is normally unblocked by piston head 111a but is partly obstructed by this head when the piston shifts to the right while head 111b partly uncovers a normally blocked venting channel 115. In this alternate position, therefore, the piston 111 throttles the flow of high-pressure fluid to conduit 126 so that the pressure increases only gradually in clutch K2 after an initial rapid rise to a lower loading level. After further loading of the clutch, for a time depending upon the countervailing fluid pressure in line 222 as well as on the force of biasing spring 122, plunger 121 is repressed to the left and, by acting upon disk 116, restores the piston 111 to normal so that the actuation of clutch K2 again proceeds at an accelerated rate in its final phase. Damper 140 associated with the brake B2, which includes a plunger 141 in a cylinder 143, coacts in a similar manner with control valve 130. Damping cylinder 143, however, communicates in the off-normal position of its plunger with a conduit 118 which receives pressure fluid from supply line 205 only in the reverse position R of selector 30, along with a conduit 210 connected to conduit 215 in the normal position of valve 90; in all other selector positions, conduits 118 and 210 are cut off. The feeder line 146 of brake B2 is connected via control valve 130 and a line 212b to a differential check valve 212a which in first gear joins the line 212b to a conduit 212, then receiving pressure fluid from a conduit 209 with selector 30 in position 1, and in reverse admits pressure fluid from conduit 118 to line 212b.

In accordance with my present invention, line 118 is extended to a port 117 of the cylinder of valve 110 located between faces 119 and 119A of piston heads 111b and 111c, respectively. In reverse, therefore, pressure in line 118 aids the force of spring 122 in overcoming the feedback pressure of spur 126b to restore the piston 111 to normal at a level of loading of clutch K2 which otherwise would not suffice to drive the damping plunger 121 into its left-hand position illustrated in FIG. 5. Thus, pursuant to my invention, the delay period retarding full operation of clutch K2 is considerably foreshortened in reverse, as compared with first gear when conduit 118 carries no pressure and a higher degree of loading of clutch K2 is required to repress the plunger 121.

The function of other elements shown in the drawing and not specifically described above will be apparent from a reference to my prior U.S. Pat. No. 3,593,599. For the sake of simplicity, coupling elements K1, B1 and B1F have been shown directly connected to the valve assembly of FIG. 4 by way of lines 208b, 216 and 214, respectively, with omission of their associated control valves and dampers. Also, a ring channel 80 of valve 70 could be connected to conduit 208 instead of conduit 209 if it were desired to operate the brake B2, with establishment of the "first gear" mode, in all forward positions of the selector, rather than just in position 1 in which a line 235 leading to valve 60 and connected to conduit 209 is pressurized from feeder line 205.

I claim:

1. In a transmission system connected between a fuel-powered engine and an output shaft driven thereby, in combination:
   gear-shifting means for switching between a plurality of forward speed ratios and a reverse speed ratio of said output shaft with reference to said engine, said gear-shifting means including a fluid-operated clutch actuatable to establish one forward speed ratio and said reverse speed ratio;
   a speed selector having a forward position and a reverse position;
   an operator-controlled accelerator for varying the fuel supply to said engine;
   switchover means controlled by said speed selector and responsive to the position of said accelerator and to the speed of said output shaft for actuating said clutch in said reverse position and under certain load conditions in said forward position of said speed selector; and damping means responsive to said speed selector for retarding full operation of said clutch by a first delay period in said forward position and by a second delay period shorter than said first delay period in said reverse position thereof;

said switchover means comprising a control valve inserted between said clutch and a source of pressure fluid therefor;

said control valve including a cylinder with a piston, biasing means tending to hold said piston in a normal position enabling rapid flow of fluid from said source to said clutch, and a feedback connection from said clutch to said cylinder for shifting said piston into a throttling position against the force of said biasing means upon partial pressurization of said clutch;

said damping means comprising a plunger mechanically linked with said piston and fluidically connected to said clutch for displacement in a direction restoring said piston to said normal position upon further pressurization of said clutch;

said control valve being provided with an ancillary inlet connected to said source in said reverse position of said speed selector for subjecting said piston to a supplemental force aiding the force of said biasing means in said reverse position of said speed selector.

2. The combination defined in claim 1 wherein said gear-shifting means further includes fluid-controlled drive-establishing means actuatable concurrently with said clutch to establish said reverse speed ratio but unactuated upon the establishment of said one forward speed ratio, said damping means being fluidically coupled with said drive-establishing means for reducing said delay period in said reverse position.

3. The combination defined in claim 2 wherein said drive-establishing means comprises a brake.

4. The combination defined in claim 3 wherein said forward speed ratios include a low, an intermediate and a high speed ratio, said one forward speed ratio being said high speed ratio.

5. The combination defined in claim 1 wherein said piston is provided with a pair of piston heads of different diameters, said inlet terminating at a port of said cylinder located between said piston heads for applying differential fluid pressure to said piston in generating said supplemental force.

6. The combination defined in claim 5 wherein said gear-shifting means further includes a fluid-operated brake actuatable concurrently with said clutch to establish said reverse speed ration, said brake being provided with control means provided with a conduit connected to said source in said reverse position of said speed selector, said ancillary inlet being connected to said conduit.

7. The combination defined in claim 6 wherein said control means includes a damper for said brake connected to said conduit for pressurization from said source in said reverse position but disconnected from said source in said forward position of said speed selector.

* * * * *